Figure 1:
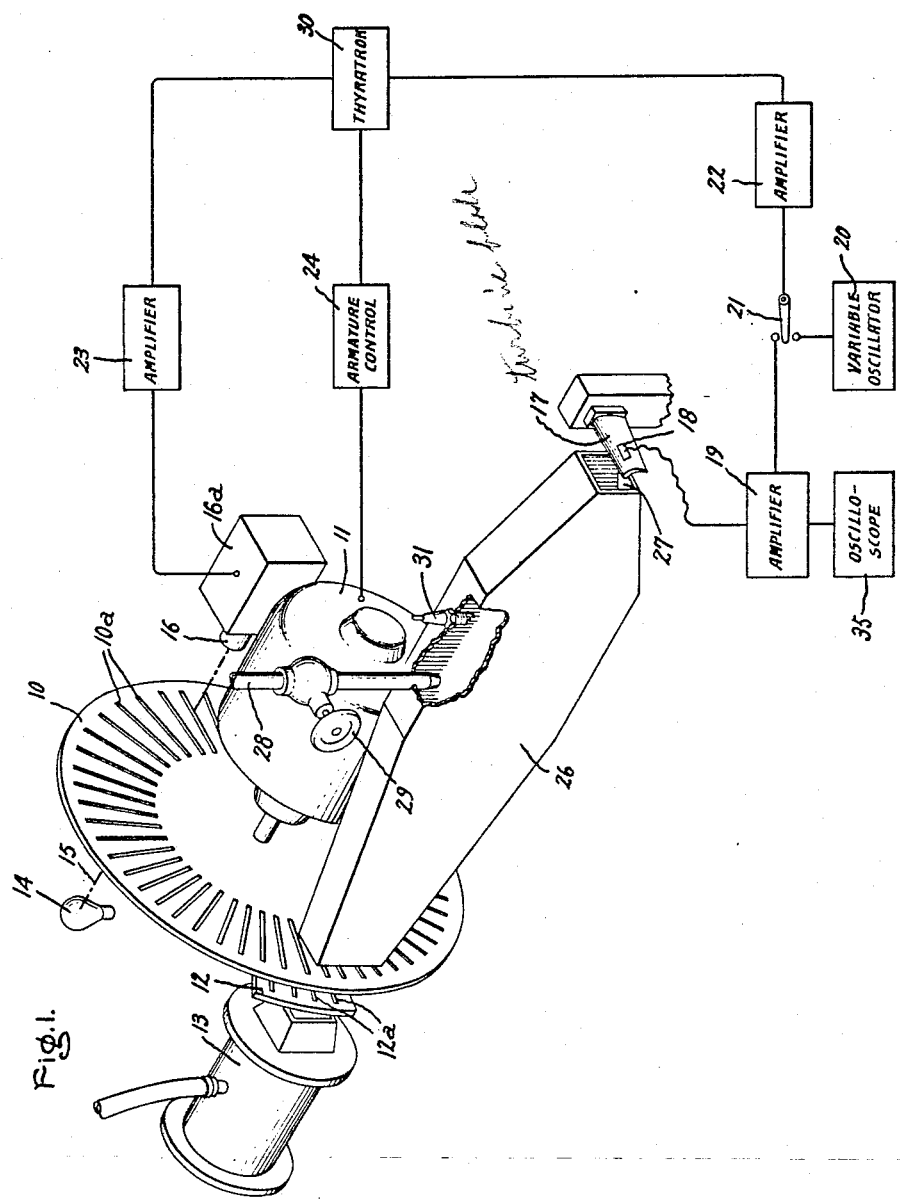

June 29, 1954     S. E. GAMAREKIAN     2,682,167
FATIGUE TESTING APPARATUS

Filed Dec. 29, 1951     2 Sheets-Sheet 1

Inventor:
Sooren E. Gamarekian,
by Paul A. Frank
His Attorney.

Patented June 29, 1954

2,682,167

UNITED STATES PATENT OFFICE 2,682,167

FATIGUE TESTING APPARATUS

Sooren E. Gamarekian, Scotia, N. Y., assignor to General Electric Company, a corporation of New York Application December 29, 1951, Serial No. 264,057

8 Claims. (Cl. 73—67)

This invention relates to a fatigue testing apparatus for flexing metals to the point of fracture. More particularly, the invention relates to an apparatus which will test turbine buckets by subjecting them to a series of rapid pneumatic pulses.

The blades or buckets of turbines used in jet engines and gas turbines must be able to withstand not only great heat but also considerable mechanical stress. This mechanical stress is particularly damaging in the case of turbines used in jet engines where constant acceleration and deceleration subjects the turbine blades to a wide variety of vibrational stress frequencies. Under the rigorous operating conditions existing inside of a jet engine, cracks develop in turbine blades very quickly and it is not unusual for portions of the blades, or even entire blades, to fly off. The loss of several blades not only reduces the torque available from the turbine but also frequently causes an imbalance which necessitates promp replacement of the blades.

Turbine blades are made with sufficient strength to resist fracture from a strong steadily applied force. Consequently, it has been known for some time that the cause of blade fracture was vibration at about the resonant frequency of the blades. Therefore, efforts to improve turbine blades have been directed toward increasing the resistance to blades to vibrational stresses. An adequate means of determining whether or not a given turbine blade is satisfactory is one of the most important requirements of a blade improvement program. While developmental blades could be tested by using them in a jet engine under actual operating conditions, this method of testing is cumbersome and time-consuming.

It is an object of this invention to provide an apparatus which will apply a vibrational stress to a turbine blade simulating actual operating conditions.

It is another object of the invention to provide an apparatus which will deliver a series of rapid pneumatic pulses.

It is a further object of this invention to provide an apparatus which will apply pneumatic pulses to a turbine bucket blade at resonant frequency even though the resonant frequency undergoes a change during the test.

A further object of my invention is to provide a turbine bucket testing apparatus which will provide a series of rapid pneumatic pulses heated to a temperature which will simulate actual conditions encountered on the interior of an internal combustion engine utilizing a gas turbine as one of its elements.

Briefly stated, in accordance with one aspect of my invention, a rotatable disk having a plurality of spaced radial apertures has a grate member equipped with apertures coextensive with those of a segment of the disk and positioned in alignment therewith. A fluid stream directed through the apertures of the grate member is interrupted by the rotation of the apertures of the disk before striking a work piece. The rate of rotation of the disk is controlled by the vibration of the work piece.

Figure 2:
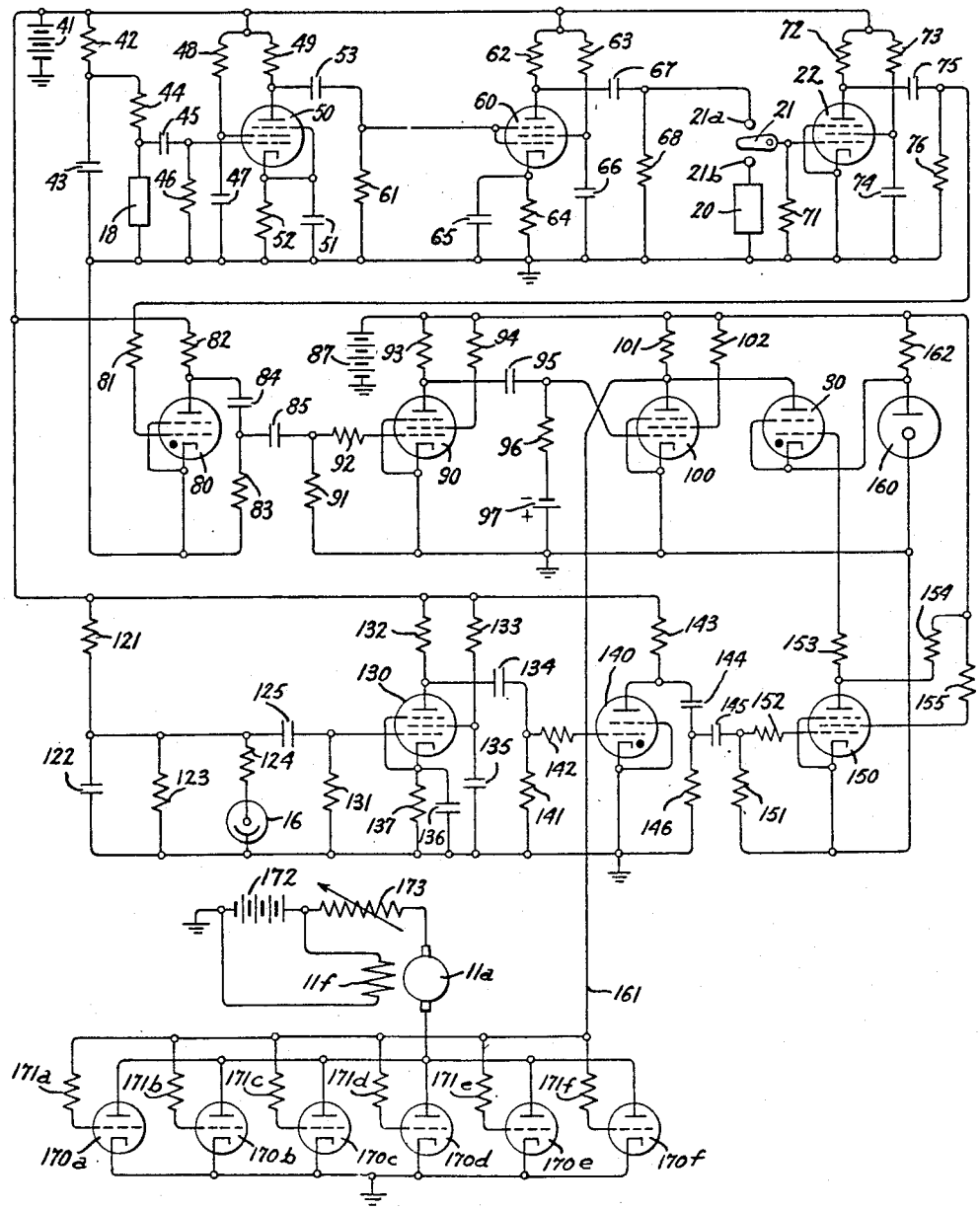

Referring to the drawings, Fig. 1 is a diagrammatic perspective showing the mechanism and control circuit of this invention. Fig. 2 shows the control circuit including the amplifying circuits and thyratron circuit along with the motor control.

Referring to Fig. 1, a slotted disk 10 is rotated by a motor 11. Extending over a segmental portion of the disk 10 is a grating 12 which has slots coextensive with those of the disk 10. A stream of air or other gas from a source 13 is positioned to blow through the slots of the disk 10 and grating 12 when the slots in these two members are in alignment. When the disk 10 is rotated the slots in the members 10 and 12 will be in alignment at particular intervals between which the stream of gas from the source 13 is interrupted. This changes the stream into a series of pneumatic pulses on the side of the disk 10 opposite the source 13. The frequency of these pulses depends upon the rate of rotation of the disk 10. A light source 14 is positioned to throw a beam 15 through the slots of the disk 10 onto the cathode of a photoelectric cell 16 positioned in an instrument box 16a. The photoelectric cell 16 conducts whenever a slot passes the beam 15 and thus the rate of rotation of the disk 10 is marked by the photoelectric cell 16.

The pneumatic pulses emerging from the disk 10 impinge upon a test piece 17 here shown as a turbine blade. At frequencies which are far removed from the resonant frequency of the test piece 17 the pneumatic pulses have little effect. However, as the resonant frequency of the test piece 17 is approached, the pneumatic pulses have a cumulative effect and the test piece 17 may be made to vibrate with a stress beyond the resistive ability of the metal. A vibration-sensitive element 18 mounted on the test piece 17 responds to this vibration to send out an electric signal proportional to the amplitude of vibration. This signal is increased in amplitude by passage through an amplifier 19. The amplified signal may be observed by means of an oscilloscope 35.

A variable oscillator 20 may be connected through a manual switch 21 and an amplifier 22 to a thyratron 30. The switch 21 may also be used to connect the vibration-sensitive element 18 to the thyratron 30 through the amplifiers 19 and 22. The photoelectric cell 16 is also connected to the thyratron 30 through an amplifier 23. The amplifier 23 and the amplifier 22 are connected respectively to the control electrode and anode (Fig. 2) of the thyratron 30. The anode of thyratron 30 is connected through an armature control 24 to the motor 11.

The disk 10, mounted directly upon the shaft of motor 11, has a large number of spaced radial slots 10a. The grating 12 positioned as near as possible to disk 10 and coextensive with a segmental portion thereof, also has a number of slots 12a of the same size and spacing as the slots 10a in disk 10. The source of gas 13, which is normally air, is positioned to pass a fluid stream through the slots of the grating 12 and disk 10 during moments when these slots are in alignment. When disk 10 is rotating, the stream of fluid then becomes a series of pneumatic pulses on the other side of the disk from the source 13. These pulses are passed through a housing 26 having an outlet 27 at the end thereof farthest removed from disk 10.

The housing 26 has a source of fuel gas 28 connected thereto. When it is desired to heat the pneumatic fluid passing through the housing 26, a valve 29 is opened admitting the gas 28 to the interior of housing 26. The combustible mixture may be ignited by means of a spark plug 31 extending into the interior of housing 26. The housing 26 is designed to direct pneumatic pulses originating at disk 10 toward the outlet 27 where they can impinge upon the work piece 17.

The work piece 17 has mounted upon it a vibration-sensitive element 18 which will convert mechanical vibrations into electric current. Such a vibration-sensitive element may take the form of a strain gage of types well known in the art. This consists of a length of strain-sensitive wire (not shown) which may be in the form of a loop bonded to a piece of paper and connected to a test piece at the bending mode undergoing test. A unidirectional current flowing through such a strain gage will vary slightly as the wire is flexed back and forth. The resulting pulsating direct current may be converted to alternating current in an amplifying system.

Another form of vibration-sensitive element utilizes the work piece itself as one plate of a capacitor which is positioned near a stationary plate (not shown) which serves as the other plate. The vibration of the test piece brings the two capacitor plates closer together for one instant and then farther apart the next. Since the capacitance varies according to the distance between the plates, the two plates may be connected in a direct current circuit to give off a pulsating direct current which may be amplified as previously described with reference to a strain gage.

The pressure of the stream of air impinging upon the test piece 17 does not need to be very great in order to induce vibration of a high amplitude in the test piece provided the frequency of the pneumatic pulses is near the resonant frequency of the test piece. A pulse pressure of the order of 2 ounces is sufficient to bring about the fracture of a test piece in a short time. This fracture may take the form of one or more cracks so small that their detection is difficult. Since such cracks have a damping effect upon the test piece and lower its resonant frequency, in order to hold the test piece at resonant frequency it is necessary that a control circuit be incorporated which lowers the rate of rotation of the motor 11 as the resonant frequency of the test piece 17 decreases.

A thyratron motor control circuit of the type disclosed in Moyer Patent 2,312,117 may be utilized in order to vary the rotational speed of the motor 11 in accordance with the message received from the vibration-sensitive device 18 mounted upon the work piece 17. For frequencies of the order of 1500 cycles per second, such a thyratron motor control device is sufficiently sensitive. However, in order to achieve maximum vibration it is necessary that the frequency of the pneumatic pulses be held to within one or two cycles of the resonant frequency of the test piece. Accordingly, at frequencies above 3000 cycles per second, it is desirable to utilize a thyratron motor control similar to that disclosed in the Moyer patent to achieve coarse control and to use a circuit similar to that illustrated in Fig. 2 to achieve fine control of the motor speed.

Referring to Fig. 2, the vibration-sensitive element 18 is shown in block form. During operations, the signal from element 18 is impressed upon the control electrode of a vacuum pentode 50 through a capacitor 45. The sine wave thus impressed is amplified by the pentode 50 and then further amplified by passage through the vacuum pentode 60. The tubes 50 and 60 comprise a two-stage amplifier shown in block form at 19 in Fig. 1.

The variable oscillator 20 is shown in block form in Figs. 1 and 2. Circuit details of this oscillator are not illustrated since it may take the form of any of the familiarly known oscillators which may be made to oscillate at frequencies in the range of 1000 cycles per second to about 20,000. The oscillator 20 is utilized in the circuit only when the switch 21 is connected to its contact 21b as will be more fully described hereinafter.

The circuit illustrated in Fig. 2 will be further described on the assumption that the switch 21 is connected to its contacts 21a thereby impressing the amplified sine wave from tube 60 on the control electrode of the vacuum pentode 22. The tube 22 amplifies the sine wave still further and in addition clips the top and bottom of the wave to produce a wave having a steep slope. This clipped signal is then impressed upon the control electrode of a thyratron device 80.

The thyratron 80 starts to conduct when the signal voltage impressed upon its control electrode changes from a negative to a positive value. However, as soon as this occurs, a capacitor 84 of about 50 mmf. capacitance is discharged so the anode voltage of thyratron 80 decreases. A resistance 82 of 1 megohm holds the voltage slightly positive. When the signal impressed upon the control electrode of tube 80 becomes sufficiently negative, the tube stops conducting and capacitor 84 is again charged to the potential of source 41. Thus, the voltage across a resistance 83, which is impressed upon the control electrode of a vacuum pentode 90, has a negative sawtooth form with peaks occurring at points where the tube 80 conducted and caused discharge of capacitor 84.

The vacuum pentode 90 serves to amplify the signal impressed upon the grid thereof. The signal voltage from the anode of tube 90 is impressed upon the control electrode of a vacuum pentode 100 which in turn inverts the signal. The signal from the anode of tube 100 is then impressed on the plate of the thyratron 30.

The signal from photoelectric cell 16 will now be traced. The signal from the anode of the photoelectric cell 16 is impressed upon the control electrode of a vacuum pentode device 130 through a capacitor 125. The device 130 amplifies the signal from the photoelectric cell 16 in a manner comparable to the amplification of the signal from the element 18 by amplifier 22. The signal from device 130 is then impressed upon the control electrode of a thyratron 140.

Thyratron 140 functions in a manner similar to that of thyratron 80, capacitor 144 being comparable to the capacitor 84 and the capacitor 145 being comparable to the capacitor 85. The negative sawtooth signal from the resistance 146 in the anode circuit of thyratron 140 is now impressed upon the control electrode of a vacuum pentode 150 which amplifies the signal in a manner similar to that by which pentode 90 amplifies the signal originating at the element 18.

The signal from the tube 150 is not inverted as was done in the case of the signal from the element 18 by the tube 100. The signal from tube 150 is impressed upon the control electrode of thyratron 30 through a current limiting resistance 153. The signal from the anode of tube 100 is applied to the anode of the thyratron as has been described previously. Thyratron 30 will now conduct in accordance with the phase relations existing between the two signals, the sawtooth signal on the anode and the sawtooth signal on the control electrode.

These signals originating at the elements 18 and 16 render the tube 30 non-conducting during the intervals between negative peaks on the anode and positive peaks on the control electrode and conducting from the positive peaks on the control electrode to the negative peaks on the anode.

Anode voltage from the thyratron 30 is impressed upon the control electrodes of a plurality of triodes 170a to 170f connected in parallel through a conductor 161. While only 6 triodes are shown, this circuit may actually include a number of additional triodes. Anode voltage for these triodes is furnished from a 250-volt source 172. Current for the armature 11a of the motor 11 is supplied from the anodes of the triodes 170a–170f. Since the tubes 170a–170f conduct under control of the phase relations existing between the signals received from the element 18 and photoelectric cell 16, the speed of the motor 11 may be controlled. The photoelectric cell 16 measures the speed of the motor itself. Consequently, the vibration-sensitive element 18 actually controls the speed of motor 11. The element 18 is positioned on a test piece 17 and delivers a signal voltage in accordance with the vibration frequency of the test piece. This, it is actually the resonant frequency of the test piece 17 which determines the speed of the motor 11.

It was previously mentioned that the source 172 delivers 250 volts D. C. The source 41 should be a regulated power supply of 300 v. and the source 87 should also be a regulated power supply of 300 v. The battery 97 may conveniently be a 24-volt biasing battery.

The circuit illustrated in Fig. 2 includes a number of resistors and capacitors which serve their usual functions in the circuit illustrated. While these functions are so well known to those skilled in the art that no further description is believed to be necessary, the resistances and capacitances of most of the resistors and capacitors illustrated are given in the table below opposite the numbers of these parts shown in the drawings. It is understood that most of the values given may be varied considerably without rendering the circuit inoperative. The tube types are also listed in the table.

*Table*

| Capacitors | | Resistors | | | | Tubes | |
|---|---|---|---|---|---|---|---|
| No. | Rating | No. | Rating | No. | Rating | No. | Type |
| 43 | 10 mf. | 42 | 10 K | 96 | 200 K | 22 | 6SJ7 |
| 45 | 25 mf. | 44 | 15 K | 101 | 30 K | 30 | 2D21 |
| 47 | 0.1 mf. | 46 | 100 K | 102 | 100 K | 50 | 6SJ7 |
| 51 | 25 mf. | 48 | 750 K | 121 | 240 K | 60 | 6SJ7 |
| 53 | 0.05 mf. | 49 | 240 K | 123 | 100 K | 80 | 2D21 |
| 65 | 25 mf. | 52 | 750 K | 124 | 4 M | 90 | 6SJ7 |
| 66 | 0.1 mf. | 61 | 240 K | 131 | 4 M | 100 | 6SJ7 |
| 67 | 0.05 mf. | 62 | 250 K | 132 | 100 K | 130 | 6SJ7 |
| 74 | 0.1 mf. | 63 | 750 K | 133 | 300 K | 140 | 2D21 |
| 75 | 0.05 mf. | 64 | 1,000 K | 137 | 600 K | 150 | 6SJ7 |
| 84 | 50 mf. | 68 | 250 K | 141 | 500 K | 160 | VR159 |
| 85 | 0.02 mf. | 71 | 1,000 K | 142 | 240 K | 170a–170f | 6AS7 |
| 95 | 0.05 mf. | 72 | 100 K | 143 | 1 M | | |
| 122 | 10 mf. | 73 | 300 K | 146 | 50 K | | |
| 125 | .01 mf. | 76 | 300 K | 151 | 240 K | | |
| 134 | 0.05 mf. | 81 | 250 K | 152 | 240 K | | |
| 135 | 0.1 mf. | 82 | 1 M | 153 | 100 K | | |
| 136 | 25 mf. | 83 | 50 K | 154 | 30 K | | |
| 144 | 50 mmf. | 91 | 200 K | 155 | 70 K | | |
| 145 | 0.006 mf. | 92 | 200 K | 162 | 15 K | | |
| | | 93 | 100 K | 171a–171f | 100 K | | |
| | | 94 | 390 K | | | | |

It is desirable to adjust the phase relations between the signal originating at the element 18 and the photoelectric signal so that the tubes 170a–170f are conducting about 50% of the time. This gives the closest control over the motor speed from the standpoint of lock-in since a slight increase or decrease in the speed of the motor 11 will not prevent the two signals from holding their lock-in phase relation. The proper manual adjustment of the variable resistor 173 (Fig. 5) in the armature circuit controls this phase relationship.

Referring to Fig. 1, the operation of the device will now be described. After the test piece 17 has been placed in position near the outlet 27, the vibration-sensitive element 18 is connected thereto and also connected to the amplifying circuit 19. The manual switch 21 is arranged so that the variable oscillator 20 is connected into the circuit with amplifier 22 and thyratron 30 through the contacts 21b. The speed of the motor 11, then under the control of oscillator 20, is slowly increased by increasing the output frequency of the oscillator. As the speed of motor 11 is increased, the amplitude of vibration of test piece 17 may be viewed on the screen of oscilloscope 35. The approach of resonant frequency is detected by an increase in amplitude of the signal appearing on the screen of the oscilloscope. Upon the attainment of this resonant frequency, manual switch 21 is operated to bring the signal from element 18 into the circuit of thyratron 30 and to cut out the variable oscillator 20 which serves no further purpose in operating the device. The control of the motor speed now rests in the vibration-sensitive element 18. Under control of element 18 the vibration of test piece 17 is held at maximum amplitude until such time as a fracture occurs in the test piece. A fracture will change the resonant frequency of the test piece and the progress of the fracture may be followed by noting the rate of decrease of the resonant frequency. The amplitude of vibration as observed on the oscilloscope screen also decreases due to the damping effect of the fracture.

When it is desired to simulate actual operating conditions still more closely, valve 29 is opened to allow gas to enter the chamber 26, the gas being ignited by spark plug 31. Thus, while my device will not duplicate the centrifugal forces acting upon a turbine bucket during operation, it may be seen that the vibration forces and heat may be closely duplicated.

While the present invention has been described by reference to particular embodiments thereof, it will be understood that numerous modifications may be made by those skilled in the art without actually departing from the spirit of the invention. Therefore, I aim in the appended claims to cover all such equivalent variations as come within the true spirit and scope of the foregoing disclosure.

What I claim as new and desire to secure by Letters Patent of the United States is:

1. Fatigue testing apparatus comprising a rotatable disk having a plurality of spaced radial slots, an electric motor for rotating said disk, a stationary grating positioned in proximity to one side of said disk, said grating having slots coextensive with those of a segment of said disk and in alignment therewith, means for directing a stream of air through the slots of said grating and disk whereby said stream of air is interrupted at a rate depending on the rate of rotation of said disk, means for directing the resulting intermittent air stream to a test piece, a strain-sensitive element for mounting on a test piece, a control circuit connecting said strain sensitive element to the electric motor, and circuit means for determining the rate of rotation of said motor connected to said control circuit whereby the rotation rate of the motor is synchronized to the frequency of a test piece at its maximum amplitude of vibration.

2. Fatigue testing apparatus comprising a rotatable disk having a plurality of spaced radial slots, an electric motor for rotating said disk, a stationary grating positioned in proximity to one side of said disk, said grating having slots coextensive with those of a segment of said disk and in alignment therewith, means for directing a stream of air through the slots of said grating and disk whereby the stream of air is interrupted at a rate depending on the rate of rotation of the disk, means for directing the resulting intermittent air stream to a test piece, a vibration-sensitive element for mounting on a test piece, an amplifier circuit connected to said vibration-sensitive element, a thyratron motor control connected to said amplifier, an electronic circuit for determining the rate of rotation of said motor, a circuit connecting said electronic circuit to said thyratron motor control, and a speed control circuit connecting said motor to said thyratron motor control whereby the rotation speed of said motor is synchronized with the vibration frequency of said vibration-sensitive element.

3. Apparatus as claimed in claim 2 wherein the electronic circuit includes a phototube positioned to count the slots of the disk passing a particular point during the rotation of the disk.

4. Apparatus as claimed in claim 2 wherein a variable oscillator may be transferred into the circuit in place of the vibration-sensitive element.

5. Apparatus as claimed in claim 2 including an oscilloscope in the circuit with said vibration-sensitive element for measuring the amplitude of the vibrations of said element.

6. Fatigue testing apparatus comprising a rotatable disk having a plurality of spaced radial slots, an electric motor for rotating said disk, a source of light positioned to pass a light beam through the slots of said disk, a photoelectric cell in the path of said beam whereby the slots passing said beam during rotation of said disk result in the energization of said cell, a thyratron to control the rate of rotation of said motor, a circuit connecting the signal from said photoelectric cell to said thyratron, a circuit connecting said thyratron to the armature circuit of said motor, a grating positioned near one side of said disk, said grating having slots coextensive with the slots of a portion of said disk and in alignment therewith, means for passing a stream of air through the slots of said grating whereby the rotation of said disk interrupts said stream of air, means for directing the interrupted stream of air toward a test piece, a strain-sensitive element mountable upon a test piece whereby said strain-sensitive element is flexed by vibration of a test piece, and a circuit connecting said strain-sensitive element to said thyratron whereby the signals received by said thyratron from the photoelectric cell and strain-sensitive element are synchronized by controlling the rotation rate of the motor relative to the vibration frequency of the strain-sensitive element.

7. Apparatus as claimed in claim 6 wherein the circuits connecting the photoelectric cell and the strain-sensitive element to the thyratron include means for amplifying and clipping the respective signals.

8. Apparatus as claimed in claim 6 including means for heating the intermittent pulses of air directed at the test piece.

References Cited in the file of this patent

UNITED STATES PATENTS

| Number | Name | Date |
|---|---|---|
| 2,326,033 | Hutcheson | Aug. 3, 1943 |
| 2,372,968 | Metcalf | Apr. 3, 1945 |
| 2,496,632 | Lazan | Feb. 7, 1950 |
| 2,500,764 | MacGeorge | Mar. 14, 1950 |
| 2,528,026 | Allen et al. | Oct. 31, 1950 |
| 2,554,212 | Quinlan | May 22, 1951 |

FOREIGN PATENTS

| Number | Country | Date |
|---|---|---|
| 590,262 | Great Britain | July 11, 1947 |